(12) United States Patent
Zazi (10) Patent No.: US 8,466,572 B2
(45) Date of Patent: Jun. 18, 2013

(54) DEVICE, A SYSTEM INSTALLATION AND A METHOD

(76) Inventor: David Zazi, Södertälje (SE)

( * ) Notice: Subject to any disclaimer, the term of this patent is extended or adjusted under 35 U.S.C. 154(b) by 298 days.

(21) Appl. No.: 12/820,502

(22) Filed: Jun. 22, 2010

(65) Prior Publication Data

US 2011/0309623 A1    Dec. 22, 2011

(51) Int. Cl.
*F03D 9/00* (2006.01)

(52) U.S. Cl.
USPC .................................................. 290/44

(58) Field of Classification Search
USPC .................................................. 290/43–44
See application file for complete search history.

(56) References Cited

U.S. PATENT DOCUMENTS

| | | |
|---|---|---|
| 4,070,131 A | 1/1978 | Yen |
| 4,499,034 A | 2/1985 | McAllister, Jr. |
| 6,201,313 B1 | 3/2001 | Nakamats |
| 6,365,985 B1 | 4/2002 | Cohen |
| 7,291,937 B2 * | 11/2007 | Willisch et al. ................ 290/44 |
| 7,538,447 B1 | 5/2009 | Berenda et al. |
| 7,830,127 B2 * | 11/2010 | Corcelles Pereira et al. ... 322/24 |
| 2007/0222225 A1 | 9/2007 | Mahoney |
| 2009/0072545 A1 * | 3/2009 | Van Michaels ............... 290/1 A |
| 2009/0113895 A1 * | 5/2009 | Steele et al. .................... 60/780 |
| 2009/0230691 A1 | 9/2009 | Presz, Jr. et al. |
| 2010/0170263 A1 * | 7/2010 | Steele et al. .................... 60/781 |

FOREIGN PATENT DOCUMENTS

| | | |
|---|---|---|
| CA | 2 699 774 A1 | 7/2009 |
| SE | 532 940 C2 | 5/2010 |

* cited by examiner

Primary Examiner — Jean F Duverne
(74) Attorney, Agent, or Firm — Foley & Lardner LLP (57) ABSTRACT

The invention relates to a device for generating electrical power, wherein the device (3) is adapted to be installed in connection with a building or a construction provided with at least one first gas source (7a, 7b, 7c, 7d) adapted to provide at least one first gas stream, wherein the device comprises a gas turbine (13) adapted to receive at least a part of the at least one first gas stream (9) from the at least one first gas source and to convert at least a part of the kinetic energy of the gas stream into electrical power. The invention also relates to a system installation comprising such a device and a method of converting wind into electrical power with such a device.

17 Claims, 3 Drawing Sheets

DEVICE, A SYSTEM INSTALLATION AND A METHOD

TECHNICAL FIELD

The present invention relates to a device for generating electrical power. The invention also relates to a system installation of the device in connection with a building or a construction provided with at least one first gas source adapted to provide at least one first gas stream. The invention also relates to a method for generating electrical power with the device.

PRIOR ART

Due to environmental issues it is desirable to generate power from renewable and clean energy sources. One such energy source is wind power, which is known to be extracted by use of a wind turbine, generally comprising a rotor which is rotated by the wind and is connected with or forms a part of a generator. One problem with wind power is that the amount of energy that may be withdrawn from wind at a given wind speed is limited, known as the Betz limit. In principle the power extractable from wind is proportional to the square of the velocity decrease over the wind turbine. The theory of wind power and wind turbines may be found in for example "Wind Energy in the Build Environment", Sander Mertens, 2006, ISBN 0906522358. Another problem is that the power generation is dependent on the present weather conditions. One known method of alleviating this drawback is to provide a battery as a buffer, wherein a more stable electrical current may be withdrawn.

In US 2007/0222225 a wind turbine is shown positioned at the top of a building next to the edge of a roof. The side surfaces of the building collect wind and direct it to the edge of the roof, and thus the location of the wind turbine, so that the wind turbine may be fed with a larger air flow. Alternatively the wind turbine may be positioned next to a mountain wall or similar structure. One drawback with this arrangement is that the wind is still intermittent, and thus the power generation will fluctuate greatly.

In the article "The Development of a Ducted Turbine Simulation Model", by Andy Grant et al., Eight International IBPSA Conference, Eindhoven, NL Aug. 11-14, 2003, a model for arranging a channel opening in the side surface of a building for achieving a more concentrated wind flow for the purposes of feeding a wind turbine is shown, utilising the same principles as above for concentrating the wind.

In the article "Modelling of the Performance of a Building-Mounted Ducted Wind Turbine", S J Watson et al. Journal of Physics: Conference Series 75 (2007) 012001, the results of a computer simulation is shown of the resulting wind flow when arranging a wind turbine inside a channel on top of a building.

In patent document U.S. Pat. No. 6,365,985 a gas turbine is shown connected with the exhaust of a ventilation system. In one of its embodiments the gas turbine is arranged at a distance from the exhaust, but due to that the gas flow drops off with distance only a small efficiency can be achieved. In another of its embodiments a shroud is arranged to connect the gas turbine with the exhaust, but this however leads to that the pressure increases so that the ventilation fan needs to work harder, offsetting the energy gain from generation with the wind turbine. In U.S. Pat. No. 7,538,447 another example of a wind turbine receiving a flow from a ventilation exhaust is shown, in which a guiding body is arranged to lead the exhaust flow on the outside of the body to the wind turbine. However, the efficiency of this device is questionable.

In patent document US 2009/0230691 a wind turbine is shown comprising a combination of a rotor, a mixer in the form of a shroud and an ejector, the construction of which is assumed to increase the efficiency of a free standing wind turbine. The mixer mixes the part of the wind going through the rotor and the part that flow around the rotor and into the mixer.

In patent document U.S. Pat. No. 4,499,034 a cooling tower according to known design is shown comprising a 100 m tall, hollow tower, wherein air is supplied at the bottom through a plurality of smaller channels, wherein the air is heated by waste heat from an industrial process and rises upwards to escape the tower. The document shows the creation of a vortex inside the tower, which vortex continues above the escape opening and thus raises the effective height of the tower. Gas turbines are further arranged inside the smaller channels in the bottom for regenerating power from the waste heat.

SUMMARY OF THE INVENTION

One objective of the present invention is to indicate an improved device for generating electrical power from a gas stream.

According to one aspect of the invention this objective is achieved with the device according to claim 1, which is further shaped in accordance with the characterizing part of the same claim.

According to another aspect of the invention this objective is also achieved with a system installation according to claim 14.

According to yet another aspect of the invention this objective is also achieved with a method according to claim 15.

By arranging the device to receive at least one second gas stream and shaping the device to influence the second gas stream to generate a sub-pressure in connection with exhausting the first gas stream from the gas turbine several advantages may be achieved. One advantage is that since the pressure difference across the rotor becomes larger than if the secondary stream would have been absent the efficiency of the gas turbine may be increased. This may partly also be due to that the second gas stream may indirectly contribute to the energy available for conversion by the gas turbine. Another advantage is that since the pressure is lower on the exhaust side of the gas turbine the first gas stream encounters less resistance against its flow, wherein the device according to the invention may be used in conjunction with sources of gas streams which are more vulnerable to, or could be subjected to adverse effects from, working against a high flow resistance for the gas stream. Yet another possible advantage is that the flow of the gas stream may be increased with the aid from the second gas stream. Preferably the device is also arranged to allow mixing of the first and the secondary gas streams at the exhaust of the first gas stream. This may help in the creation of the sub-pressure.

According to one embodiment the device comprises a main gas channel, wherein the gas turbine is arranged inside the main gas channel. Preferably the main gas channel is adapted to conduct at least the first gas stream to the gas turbine inside the main channel. This will improve the efficiency of the device, since the turbine may then work with an efficiency beyond the Betz limit.

The device is preferably adapted to be installed in connection with a building or a construction. Preferably the device is adapted to be installed in or on the upper part of a building, more preferably on the roof of the building, and preferably the building is a high-rising building. A construction may be any construction such as a factory, scaffolding or a chimney. The construction or building may also be a tunnel, such as a road-tunnel, which usually are provided with high power ventilation, or a train or tram tunnel, in which wind may be created by the trains or trams running inside the tunnel. Preferably the construction or building is located on a high altitude, and/or being provided with strong wind sources to ensure a high power generation.

The building preferably comprises one or more gas sources, which gas sources may or may not be independent from each other. According to one embodiment the building or construction comprises at least one first gas source. The first gas source is preferably therefore external from the device intended to be installed in connection with the building, but once installed, the device and the gas source are preferably at least to some extent associated with each other, and the device is preferably adapted for receiving the gas stream of streams from the gas source. Preferably the device is positioned in fluid connection with the gas source, wherein at least a part of the first (or second) gas stream may be communicated to the device, preferably into the device, and most preferably at least a major part of the first gas stream of the gas source may be transferred into the device. Preferably the second gas stream originates from a second gas source other than the gas source for the first gas stream. Preferably the device then receives the second gas stream from at least one secondary gas channel. Preferably the device also receives the first gas stream from a first gas channel, separate from the secondary channels.

In one embodiment the first or second gas source may be formed by the shape of the building or construction itself. In another embodiment the gas source may be formed by including an arrangement or system in the building. The gas stream from the gas source may be generated by natural phenomena, such as wind, or may be generated artificially, such as with a fan. According to a preferred embodiment the building comprises at least one gas channel arranged to carry a gas stream and forming at least a part of the first gas source. As a rule of thumb the gas channel would then carry the gas stream irrespective of the presence of the device.

With the term sub-pressure a pressure is intended that is lower than the pressure that would result if the second gas stream would be shut off. The sub-pressure could in one embodiment be achieved by the second gas stream blowing past an opening to a channel with the first gas stream, similar to the action of a venturi tube. In another embodiment the sub-pressure could be achieved by arranging an exhaust opening for the first gas stream to open in the second gas stream in the downstream direction of the second gas stream, similar to a traditional Persian wind catcher.

According to a preferred embodiment the device is shaped to influence the at least one secondary gas stream to generate a vortex in connection with exhausting the first gas stream from the turbine. By creating a vortex the velocity of the second gas stream increases, wherein the pressure of the second gas stream decreases. The second gas stream also affects the first gas stream to become a part of the vortex, wherein the eye of the vortex, which should be located at the exhaust from the gas turbine, will have a very low pressure, aiding the exhaustion of the first gas stream from the turbine. A vortex also gives a low noise when the first and second gas streams are exhausted to the atmosphere. This is important since the device is intended to be positioned on buildings, such as in connection with a domestic or office building.

According to one embodiment the device comprises at least one flow directing element arranged to direct at least a part of the secondary gas stream to flow in a helical path around the exhausted first gas stream in order to contribute to the generation of the vortex. Preferably the flow directing element comprises at least one vane arranged to direct at least a part of the secondary gas stream to flow in an angle relative to the flow direction of the exhausted first gas stream in order to contribute to generation of the vortex. Vanes are very efficient in directing gas streams into desired directions. Thus the vanes may direct the second gas stream to flow in the direction of forming the vortex. Preferably, the vane or vanes are arranged to direct the secondary gas stream to flow along a helical path for forming the vortex. Hence the secondary gas stream will form the outer circumferential flow of the vortex. Preferably, the vane or vanes extends outwardly from the body of the gas turbine, wherein the second gas stream is directed to form the vortex close to the exhaust of the first gas stream. In one preferred embodiment the vane or vanes are also arranged to support and attach the gas turbine inside the device. Preferably the vanes support and attach the gas turbine to the inner walls of a main gas channel in which the turbine is arranged.

According to one embodiment the gas turbine comprises a tubular body containing a rotor, and which tubular body is arranged to separate the first and the secondary gas streams. Preferably the first gas stream flows inside the tubular body, while the secondary gas stream flows outside the tubular body. Preferably the device mixes the first and the secondary gas streams by the tubular body ending so that it no longer separates the gas streams. Preferably the tubular body is shaped to compress the first gas stream in its flow direction after the rotor. Thus the velocity of the first gas stream increases and its pressure rises. Preferably the tubular body is also arranged to expand the secondary gas stream before allowing contact between the first and the secondary gas streams. Preferably the outside of the tubular body is further shaped so as to influence the secondary gas stream to form a sub-pressure at the exhaust of the first gas stream from the tubular body.

According to one embodiment the gas turbine further comprises a second, tubular body positioned inside the first tubular body, wherein the second tubular body is shaped to split the first gas stream into an inner and an outer part. Thus the mixing of the first and secondary gas streams is simplified since the mixing may be carried out in two steps, and hence the creation of a sub-pressure or a vortex is also simpler to achieve.

According to one embodiment the device comprises a main gas channel for conducting both the first and the second gas streams, wherein the gas turbine is positioned inside the main gas channel. By conducting both streams inside the same channel the control of the flow of the gas streams is simplified since the common volume is fixed. Thus the concentration of the gas streams and their flow may more easily be estimated so that the device may be optimized. This leads to that a lower sub-pressure may be achieved with the device.

According to one embodiment at least one secondary gas channel is arranged to carry the at least one secondary gas stream into the main gas channel, wherein the secondary gas channel opens into the main gas channel in a position after an opening for the first gas stream into the turbine. Thus an increase in pressure due to the entrance of the secondary stream is avoided before the opening for the first gas stream into the turbine, which could otherwise present an obstacle for the first gas stream and decrease the efficiency of the device. Preferably the secondary gas channel also opens into the main gas channel in a position within the extension of the turbine, and/or the tubular body surrounding the turbine. In another embodiment the secondary gas channel opens into the main gas channel in a position within 1 m from before or after the exhaust opening of the first gas stream out of the turbine and into the main gas channel. Preferably the secondary gas channel opens so as to blow the secondary gas stream into a gap formed between an outer surface of a tubular body of the turbine and the inner surface of the main gas channel.

According to one embodiment at least one secondary gas channel is arranged to exhaust the secondary gas stream to flow in a spiral path around and along the flow direction of the first gas stream in order to contribute to the generation of the sub-pressure. Preferably the at least one secondary gas channel is arranged to exhaust the secondary gas stream to flow in a spiral path around and along the flow direction of the first gas stream in order to contribute to the generation of the vortex. By arranging the secondary gas channel to connect with for example a main channel at an angle to the main channel it is possible to easily control the beginning flow path of the second gas stream. Preferably the secondary channel is arranged in an angle corresponding to the desired flow path of a tangential gas package in the vortex. Preferably, the at least one secondary gas channel is arranged to direct the secondary gas stream in a helical path, preferably around the turbine, and along and/or beyond the turbine, for creating a spiral motion and the vortex.

According to one embodiment the device is adapted to be connected with and to receive the at least first or second gas stream from a gas source comprising at least one ventilation exhaust from the building. A ventilation exhaust gives a constant and predictable flow in difference to a wind source, and thus the reliability of the device is improved. Furthermore, a lot of energy which otherwise would have been wasted may be regained. In case the ventilation exhaust is arranged to provide the first gas stream intended to enter into the gas turbine the use of a secondary flow for decreasing the pressure behind the gas turbine makes it possible to connect the gas turbine closer to the ventilation exhaust, or possibly in direct gas-tight connection with the ventilation exhaust, without obstructing the flow and forcing a ventilation fan to work harder. In case the ventilation exhaust is connected to provide the secondary gas stream the existence of an aiding secondary gas stream is ensured.

According to one embodiment the building or construction is arranged to form a gas source by amassing wind, and that the device comprises at least one wind collector adapted to collect the first and/or the secondary gas stream from the gas source of the amassed wind. By using wind as a gas source an almost free energy supply is utilised, apart from possibly its size, and which energy supply is both clean and renewable. By amassing the wind its flow will increase, so that energy may more effectively be gained from the wind. Amassing wind may be achieved by arranging a large surface, such as a side surface of a building, to guide the wind flow towards the wind collector of the device.

According to one embodiment the wind collector comprises a spoiler adapted to be arranged at one end of a side surface of the building, and which is shaped for guiding the wind to the first and/or the secondary gas channel. Wind usually amasses at an edge of a surface, but due to that the wind flows parallel to the surface its momentum will make the majority of the wind to flow a distance past the edge before turning around the edge. Hence by arranging a spoiler comprising a curved surface adapted to the expected travel path of the wind at the edge the amassed wind may be guided towards the device and its flow improved. Preferably the wind collector in the form of a spoiler further comprises an opening leading the wind flow into the device, either into a secondary gas channel, into the first gas channel or the gas turbine, or into the main gas channel.

According to another embodiment the wind collector comprises a wind channel having a wind opening arranged with its mouth close to an end of a side surface of the building for collecting and acquiring wind. By letting the wind into a wind channel the wind cannot escape once the wind has entered the channel, wherein the wind is both amassed and efficiently collected. The wind channel may then lead the wind into either the first gas channel, the gas turbine, the secondary gas channel, or the main channel. Preferably, the wind channel is provided in the building or construction, wherein, in one embodiment, the device is adapted to be connected with such a wind collector, rather than comprising the wind collector. In one embodiment of the system installation however, the system installation preferably comprises both the wind collector in the form of the tunnel and the device connected with the wind collector. This may also be the case with the previous wind collector if the spoiler is provided permanently attached onto the construction or the building.

According to one embodiment, which is at the time of writing believed to be the best mode of the invention, the device is adapted to be connected with and to receive the first gas stream from a first gas source in the building or construction comprising a first ventilation exhaust, and to be further connected with two secondary gas sources of which one is at least one second ventilation exhaust and the other is at least one wind collector, in order to receive the at least one secondary gas stream. Since the first gas source is a ventilation exhaust the device will receive an almost constant supply of the first gas stream with a fairly constant flow rate and pressure. Furthermore the device receives a secondary gas stream from one of two gas sources. Hence in case the weather is windy, the secondary gas stream may originate from wind and enhance the energy extraction from the first gas stream originating from the first ventilation exhaust. This is advantageous since the wind is most likely stronger than the gas stream from ventilation, and also, the kinetic energy from the wind may be extracted without any concern for if a ventilation fan is worked against. In case there is no wind however, the secondary gas stream may originate from a second ventilation exhaust, and hence the device may continue to operate and regain energy from the ventilation system. Due to that the secondary gas stream creates a sub-pressure the first ventilation fan will not be worked against to such a degree as to render the energy gain by the device useless. Furthermore, since the second gas stream is let out of the device without any further turbines drawing energy from the secondary gas stream, the device will likewise not work against the second ventilation fan. Preferably the device also comprises a selector arranged to select one of a plurality of gas sources for a gas stream. In this case the device comprises a selector arranged to select one of the second ventilation exhaust or a wind collector as a source for the second gas stream. Hence the most optimal gas source for the present weather conditions may be selected.

According to one embodiment the generator of the gas turbine is surrounded by a shroud and positioned inside the tubular body. Preferably the shroud is shaped to provide an aerodynamically low friction, and is thus preferably provided with smooth and rounded surfaces. In one embodiment the shroud is narrowing along the flow direction of the first gas stream, leading to a decreasing gas pressure along its length, aiding in providing a lower pressure drop. In another embodiment the shroud may be convex shaped, and is preferably shaped to influence the first gas stream to follow a spiral path, leading to a better mixing with the second gas stream.

BRIEF DESCRIPTION OF THE ATTACHED DRAWINGS

The invention is now to be described as a number of non-limiting examples of the invention with reference to the attached drawings.

FIG. 1b shows one view of the device in FIG. 1a.

DETAILED DESCRIPTION

Figures 1A, 1C:
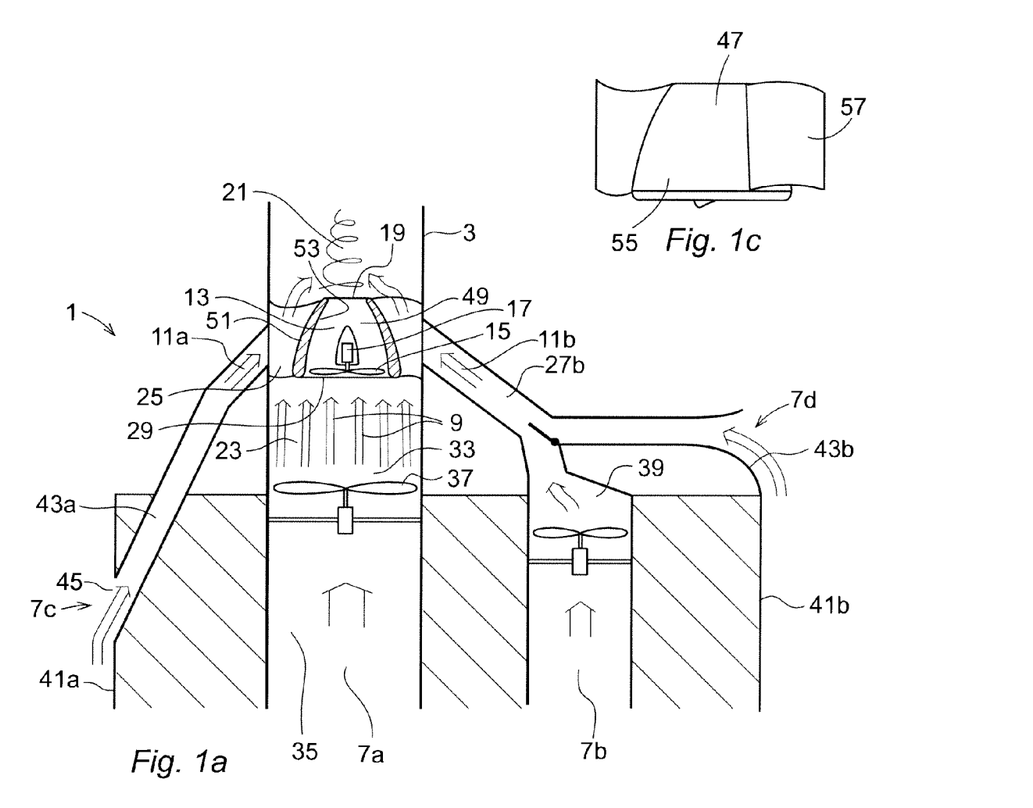
FIG. 1a shows a system installation of a device according to the invention installed in a building.
FIGS. 1c-d shows views from the side of a tubular body forming part of the gas turbine according to one example of the invention.

In FIG. 1a a system installation 1 is shown comprising a device 3 for generation of electrical power installed in connection with a construction, in this example in the form of a building 5. The system installation comprises a plurality of gas sources 7a-d adapted to generate gas streams. The gas sources 7a-d are in this example formed through cooperation between the device 3 and the building 5. In another example the gas sources could instead be formed completely by the building alone, or completely by the device alone. In this example the device is adapted to receive at least one first gas stream 9 and one or more secondary gas streams 11a-c from the plurality of gas sources. The device comprises a gas turbine 13 comprising a rotor 15 connected with a generator 17, and which is arranged to receive the first gas stream 9 to pass through the turbine, and to generate electrical power by converting a part of the kinetic energy of the first gas stream into electricity. The gas turbine may be of standard or non-standard type, but should be selected to have a suitable size and capacity.

According to one aspect of the invention the device 3 is arranged to receive the at least one secondary gas streams 11a-c into the device, and is further shaped to influence the second gas streams 11a-c to generate a sub-pressure in connection with exhausting the first gas stream 9 from the gas turbine. Thus the first gas stream 9 experiences less resistance against its flow when passing through the turbine, which may allow a larger or faster flow of the first gas stream, an increased conversion efficiency for the generator, and/or simply a decreased resistance experience by the gas source 7a when generating the flow of the first gas stream. A sub-pressure may be created by the phenomena that the secondary gas streams 11a-c may capture part of the first gas stream to follow with the secondary streams when passing the exhaust of the first gas stream, and thus creating a sub-pressure. In this example however the device 3 is shaped to control the movement path, the volume, and the speed of the secondary gas streams 11a-c, and hence also its pressure, so as to create the sub-pressure for the first gas stream. When increasing the speed of the secondary gas streams the pressure of the gas streams simultaneously decreases due to energy conversion in accordance with the law of Bernoulli.

In this example the device is shaped to influence the at least one secondary gas streams 11a-c to generate a vortex 21 in connection with the exhaust 19 of the first gas stream 9 from the turbine. The vortex thus creates a lower pressure at the exhaust 19, wherein the first gas stream 9 may more easily exit and flow through the turbine. In this example the vortex 21 is generated to circle around the exhaust 19 of the first gas stream from the turbine, with the exhaust located in the center of the vortex, and to helically flow in a direction generally away from the exhaust 19, so as to aid in bringing the first gas stream out of the turbine.

The system installation 1 and the device 3 comprises a main gas channel 23 for conducting the first gas stream, and for housing the gas turbine 13 inside the channel. The main channel 23 is arranged to conduct at least a major part of the first gas stream towards and into the turbine. This increases the efficiency of the turbine, since the first gas stream cannot as easily escape from passing the rotor 15. The turbine 13 is in this example shaped with a smaller diameter than the inner diameter of the main channel 23 in order to fit inside the channel. In this example the device is shaped with a small diameter, so as to form a gap 25 between the outer wall of the gas turbine and the inner wall of the main channel 23. Hence a small part of the first gas stream 9 may pass on the outside of the turbine without experiencing the pressure drop from passing the rotor. This is advantageous in case there for some reason is temporarily no aiding secondary gas stream, wherein the first gas stream will not have to pass the rotor unaided which would lead to a high pressure drop and the working against the gas source generating the first gas stream. Possibly a flow control member may be arranged to control the size of, or the portion of, the first gas stream that bypasses the gas turbine, possibly dependent on the availability and strength of the second gas stream.

The system installation and the device further comprise at least one secondary gas channel 27a-c for conducting the secondary gas streams. In this example the system installation and the device comprises three secondary gas channels 27a-c, but any appropriate number of channels may be provided. The secondary gas channels are arranged to conduct the secondary gas streams from their respective gas sources and into the main gas channel. In this example the secondary gas channels 27a-c open into the main gas channel in level with, but after the intake opening 29 to, the gas turbine. The exhaust openings 31a-c of the three secondary channels into the main channel 23 are equidistantly spaced around the circumference of the main channel. The three secondary gas channels 27a-c are furthermore angled relative to the direction of the main channel, so that their exhausts points in the direction of forming the tangential flow components of the vortex 21. Hence the three secondary channels will exhaust the three secondary gas streams in a direction for forming the helical vortex, and thus to create the sub-pressure.

The building 5 is in this example provided with several gas sources, in this example four gas sources 7a-d. The first 7a and second 7b gas sources are similar to each other and best shown in FIG. 1a, the third gas source 7c is best shown in FIG. 1a in combination with FIG. 3a, and the fourth gas source 7d is best shown in FIG. 1a in combination with FIG. 3b.

The first gas source 7a, which in this example generates the first gas stream 9, comprises a ventilation exhaust 33 comprising a first gas channel 35 and a ventilation fan 37 arranged inside the first channel. The ventilation fan 37 is arranged to provide forced ventilation for the building. The first gas channel 37 is further connected with the main gas channel 23 for transferring the first gas stream 9 into the main gas channel and into the device and the gas turbine. The first channel is thus connected to the beginning of the main gas channel 23 at a position before the intake opening 29 into the gas turbine. The second gas source 7b comprises a similarly arranged ventilation exhaust 39, but is in this example arranged to generate a secondary gas stream 11b. The second gas source 7b is thus connected with a secondary gas channel 27b for transferring the gas stream further into the device and the main channel behind the intake opening 29 to the gas turbine.

Figure 3A:
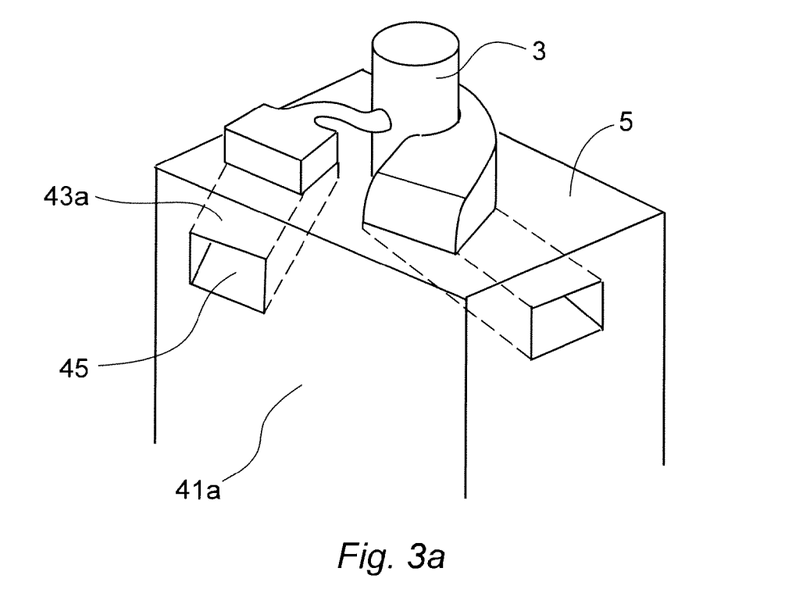
FIG. 3a shows one example of a gas source and wind catcher for a system installation of the device in connection with a building.
Figure 3B:
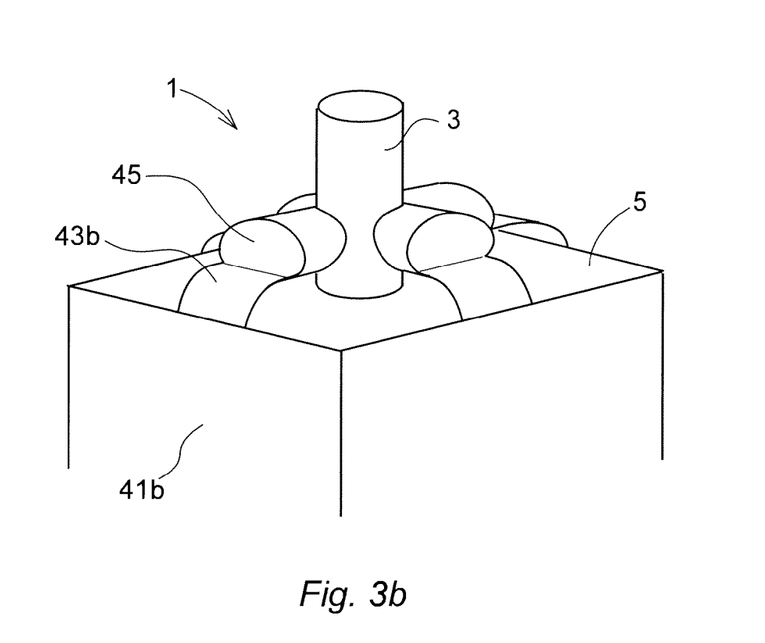
FIG. 3b shows another example of a gas source and wind catcher for a system installation of the device in connection with a building.

Commonly for the third 7c and fourth 7d gas sources of the system installation is that they are partly formed by the building 5 being arranged to amass wind. In this example the building amasses wind by the side surfaces 41a, 41b of the building forcing the wind to follow the extension of the surfaces, and thus concentrating the wind flow. In case of building a new construction or building the side surfaces may be adapted to form a gas source by angling the surfaces to direct the wind in a desired direction, or by forming curved side surfaces, such as convex side surfaces, for catching the wind. In this example, the side surfaces 41a, 41b forces the wind upwardly along the building to gather on top of the building.

In FIG. 3a the device comprises a wind collector 43a comprising a wind channel 43a for collecting the amassed wind, which is also shown in FIG. 1a on the left hand side of the building. The wind channel 43a comprises a wind opening 45 arranged with its mouth close to the upper end of the side surface 41a of the building. The wind opening 45 hence receives an amassed wind from nearly the entire side surface of the building and leads the wind into the wind channel 43a, which in turn is connected with a secondary gas channel 27a leading the wind further to the main gas channel.

In FIG. 3b the device comprises a wind collector 43b comprising a curved profile 43b for collecting the amassed wind, which is also shown in FIG. 1a on the right hand side of the building. The curved profile is arranged on the upper end of the side surface 41b of the building, and is shaped for guiding the amassed wind to the inlet of a secondary gas channel 27b. Due to that the amassed wind flows along the surface of the building 5 the momentum of the wind forces the amassed wind to extend a distance out from the edge of the building before turning to assume the general direction of the predominant wind. The curved surface 43b is hence in this example adapted to follow the natural path of the amassed wind, which would be followed in case the profile had been absent. The curved profile thus collects the amassed wind and guides it towards the inlet of a secondary channel 27b, and further into the main channel 23. This curved profile is advantageous to use on already existing buildings or constructions, which have not already been provided with a wind channel, to avoid reconstruction costs.

Yet another alternative for a wind collector is to form a wind channel (not shown) simply arranged on top of the building, having an inlet opening facing outwardly, and being connected to a secondary channel. Preferably, the wind channel is positioned somewhat raised from the roof of the building, similar to the height of the curved profile, in order to collect a larger part of the amassed wind.

Figure 1B:
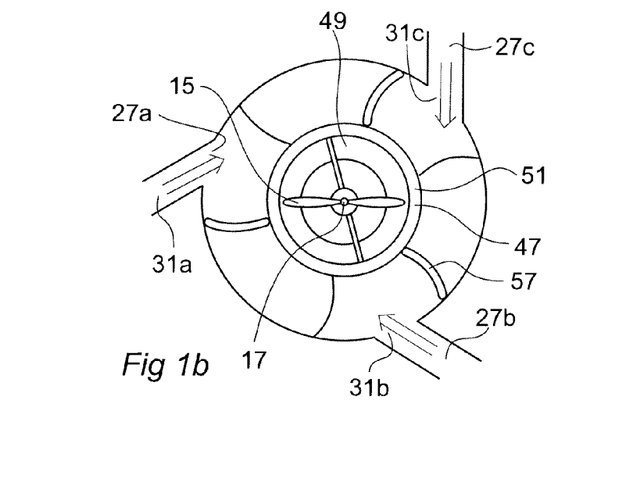
Figure 1D:
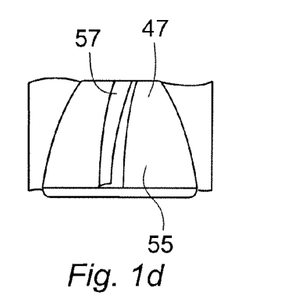

The gas turbine 13 comprises a rotor 15 being connected with a generator 17 for generation of electrical power. The rotor 15 is housed inside a tubular body 47, wherein the tubular body 47 thus comprises an inner hollow 49 for conducting the first gas stream 9 through the gas turbine. The tubular body 47 is further shaped to allow the secondary gas stream to pass on the outside of the tubular body. The tubular body is thus arranged to separate the first and the secondary gas streams from each other. The tubular body 47 also comprises a first intake opening 29 for admitting the first gas stream into the hollow and a second exhaust opening 19 for exhausting the first gas stream out of the hollow. The rotor 15 is positioned at the front end of the tubular body and within a short distance from the intake opening 29, in this example within the front most 20% of the tubular body. The tubular body comprises thin walls 51, so that, at the end of the tubular body, the distance between the first and second gas streams is short to allow easier mixing of the two gas streams after the gas turbine. The mixing of the first and the secondary gas streams aids in creating the sub-pressure and the vortex after the exhaust opening from the tubular body.

The generator 17 is in this example covered and surrounded by a shroud having an outer surface which is formed to provide an aerodynamically low friction to the first gas flow. The outer surface of the shroud is in this example smoothly narrowing with a concave shape along the flow direction of the first gas stream. The vanes of the rotor fan 15 are furthermore aerodynamically shaped, and are in this example adapted for receiving a first gas stream moving in a slightly helical manner into the gas turbine. Since the first gas stream is generated by the fan 37, the first gas stream 9 will inevitably be provided with a slightly helical motion, and by angling the vanes of the gas turbine to take this motion in consideration, the efficiency of the gas turbine 13 increases.

The tubular body 47 is provided with an inner surface 53 defining the shape of the inner hollow 49. In this example the inner surface is convex so as to decrease the diameter of the hollow along the movement direction of the first gas stream. Hence the first gas stream will be compressed after passage of the rotor and before being exhausted from the tubular body and the turbine. The tubular body also forms an outer surface 55 defining the shape of the gas turbine. The outer surface 55 is shaped to contribute to influencing the second gas stream to form said sub-pressure and vortex. In this respect the outer surface has a decreasing diameter from its front towards the end of the body in order to allow expansion of the second gas stream. The outer surface 55 is also shaped to form the gap 25 between the inner walls of the main gas channel 23 and the outer surface 55 for allowing passage of the second gas streams 11a-c, but also of the first gas stream 9 or of a part of the first gas stream if applicable.

In this example the device comprises flow directing elements 57 in the form of three vanes attached onto the outer surface of the tubular body 47, and which are arranged to direct at least a part of the secondary gas streams to form the sub-pressure, or, in this example, the vortex. The vanes 57 are convex shaped and angled to direct the secondary gas streams 11a-c to undertake a helical motion relative to the flow direction of the first gas stream, and with the first gas stream 9 in the center of the helix, wherein a vortex 21 is created. The vanes 57 are thus arranged to direct the secondary gas streams to flow in an angle relative to the flow direction of the exhausted first gas stream in order to contribute to the generation of the vortex. The vanes 57 are formed from thin plates, such as metal plates, but may also be formed in plastic or any other material with capability to form thin, shape-resistant plates. The flow directing elements 57 are also arranged to support and attach the gas turbine inside the device to the inner surfaces of the main channel 23. Hence there is no need for additional supports, which otherwise could cause an increase pressure drop. In another example the tubular body could be provided with other types of flow directing elements for controlling the motion or flow of the secondary gas stream, such as grooves, angled surfaces, protrusions, vanes or similar, and of any combinations thereof. The flow directing elements may also be arranged to cause turbulence in the secondary and/or first gas streams to allow a better mixing of the two gas streams with each other.

The device is further provided with a gas source selector 59 adapted to select one of the several gas sources for a particular gas stream. Hence it is possible to control from which gas source a particular gas stream originates. Thus depending on the prevalent wind direction a gas source located on the wind side of the building may be selected. In this example the gas source selector 59 is arranged to select one of the second gas source 7*b* in the form of a ventilation exhaust or the fourth gas source 7*d* in the form of the wind collector 43*b* comprising the curved profile as a gas source for the secondary gas stream 11*b*. Naturally, a device may contain any number of gas source selectors 59, and may be arranged to freely select any which gas source to provide a gas stream to any of the first and/or secondary gas channels and streams.

Figure 2A:
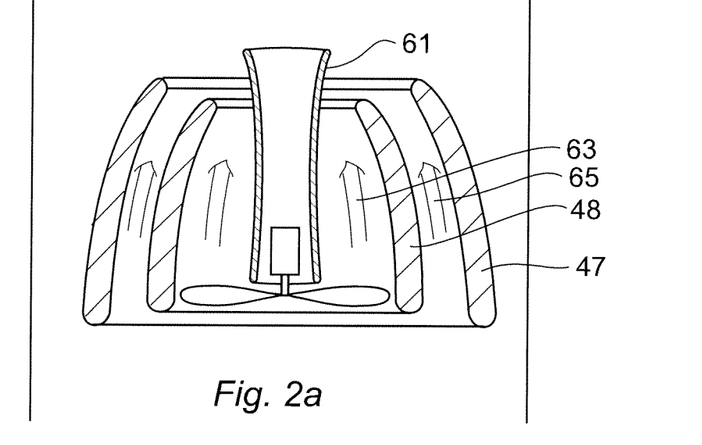
FIGS. 2a-b shows views from the side of a tubular body forming part of the gas turbine according to another example of the invention.
Figure 2B:
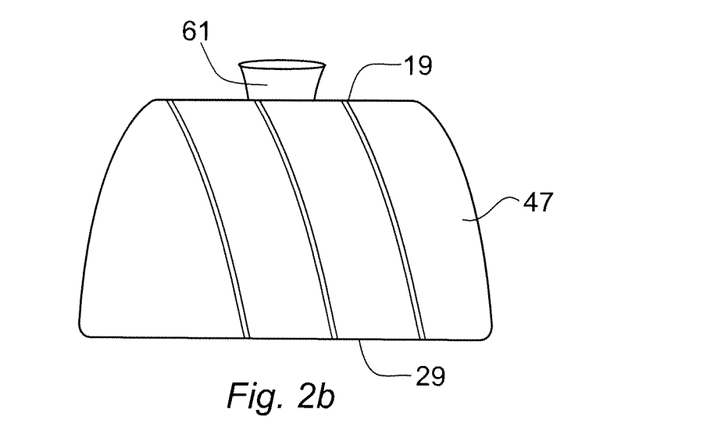

In FIGS. 2*a-b* a second example of a device comprising a gas turbine adapted to be positioned inside a main channel 23 is shown. The gas turbine assembly in FIGS. 2*a-b* is similar in function with the gas turbine 13 shown in FIGS. 1*c-d*, and may be substituted for these parts in the system installation 1 and device 3 shown in FIGS. 1*a-b*. Therefore, like parts in FIGS. 2*a-b* are given the same reference numbers as the corresponding parts in FIGS. 1*a-d*.

The device in FIGS. 2*a-b* thus comprises a gas turbine 13, including a fan, a rotor, and a generator for generating electricity, and a first tubular body 47 arranged around the gas turbine 13. The device in FIGS. 2*a-b* further comprises an additional, second, tubular body 48 arranged inside the hollow of the first tubular body 47. The second tubular body 48 is shaped to split the first gas stream into an inner 63 and an outer part 65. The second tubular body 48 is thus shaped to admit a part 63 of the first gas stream to flow inside the tubular body 48, while a second part 65 of the first gas stream flows in a gap formed between the outer surface of the second tubular body 48 and the inner surface of the first tubular body 47. Hence a part of the first gas stream may be used for providing a better mixing in combination with a second gas stream from a second gas source simultaneously flowing outside the first tubular body 47, much in the same manner and with the same advantages as described in relations to FIGS. 1*a-b*.

The device is further arranged to influence the second gas stream to flow in a spiral or helical path around and after the gas turbine. In this example the outer surface of the first tubular body 47 is provided with flow directing elements arranged to influence the second gas stream to assume a spiral or helical flow path. In this example the flow directing elements comprises grooves forming a helical pattern on the outer surface of the first tubular body 47, onto which surface the second gas stream is conducted. Such flow directing elements comprising grooves could of course also be provided on the tubular body 47 in FIGS. 1*a-b*, and the vanes in FIG. 1*a-b* could be provided on the surface of the tubular body in FIGS. 2*a-b*, and thirdly, a combination of vanes and grooves could also be provided. Finally, the outer surface could also be shaped smoothly, without any flow directing elements at all.

The device further comprises a shroud 61 arranged inside the second tubular body 48, and arranged to surround the generator of the gas turbine. In this example the shroud 61 is convex shaped, and thus adapted to compress the inner part 63 of the first gas stream slightly. The device is further arranged to influence the inner part of the first gas stream 63 to flow in a spiral or helical path inside the space between the shroud 61 and the inner tubular member 48. In this example the inner tubular body 61 and/or the second tubular body 48 may be provided with flow directing elements arranged to influence the second part of the first gas stream to take a helical flow path, wherein the inner tubular body also contributes to the creation of a vortex. This may be achieved by forming angled vanes in the space between the shroud 61 and the second tubular body 48 and/or by forming grooves running in a spiral pattern on the outer surface of the shroud 61 and/or on the inner surface of the second tubular body 48. The turbulence thus created may lead to a lower gas pressure and/or a better mixing between the gas streams after leaving the gas turbine.

The invention is not limited to the embodiments shown but may be varied freely within the framework of the following claims. In particular, the examples shown have been selected for enabling a clear illustration of the concepts and principles of the invention, from which a man skilled in the art may form a practical device or system installation, which is more optimised and fitted to a local environment and conditions.

The invention claimed is:

1. A device for generating electrical power, wherein the device is adapted to be installed in connection with a building or a construction provided with at least one first gas source adapted to provide at least one first gas stream, wherein the device comprises a gas turbine adapted to receive at least a part of the at least one first gas stream from the at least one first gas source and to convert at least a part of a kinetic energy of the gas stream into electrical power,
   wherein the device is further arranged to receive at least one second gas stream and is shaped to influence the at least one second gas stream to generate a sub-pressure in connection with exhausting the at least one first gas stream from the gas turbine,
   wherein the device is shaped to influence the at least one second gas stream to generate a vortex in connection with exhausting the at least one first gas stream from the turbine,
   wherein the at least one first gas source comprises a ventilation exhaust from the building or the construction, and
   wherein a second gas source comprises a ventilation exhaust from the building or the construction and/or a wind collector collecting wind amassed by the building or the construction.

2. A device according to claim 1, wherein the device comprises at least one flow directing element arranged to direct at least a part of the at least one second gas stream to flow in a helical path around the exhausted at least one first gas stream in order to contribute to generation of the vortex.

3. A device according to claim 1, wherein the gas turbine comprises a first tubular body containing a rotor and is arranged to separate the at least one first gas stream and the at least one second gas stream, and
   wherein the first tubular body is shaped to compress the at least one first gas stream in a flow direction after the rotor, and to expand the at least one second gas stream before allowing contact between the at least one first gas stream and the at least one second gas stream.

4. A device according to claim 3, wherein the gas turbine comprises a second tubular body positioned inside the first tubular body, wherein the second tubular body is shaped to split the at least one first gas stream into an inner part and an outer part.

5. A device according to claim 1, wherein the device comprises a main gas channel for conducting both the at least one first gas stream and the at least one second gas stream, wherein the gas turbine is positioned inside the main gas channel.

6. A device according to claim 5, wherein at least one secondary gas channel is arranged to carry the at least one second gas stream into the main gas channel,
   wherein the at least one secondary gas channel opens into the main gas channel at a position after an opening for the at least one first gas stream into the turbine.

7. A device according to claim 1, wherein at least one secondary gas channel is arranged to exhaust the at least one second gas stream to flow in a spiral path around and along a flow direction of the at least one first gas stream in order to contribute to generation of the sub-pressure.

8. A device according to claim 1, wherein the device is adapted to connect with and to receive the at least one first gas stream or the at least one second gas stream from a gas source comprising at least one ventilation exhaust from the building.

9. A device according to claim 1, wherein the building or construction is arranged to form a gas source by amassing wind, and
   wherein the device comprises at least one wind collector adapted to collect the at least one first gas stream and/or the at least one second gas stream from the gas source of the amassed wind.

10. A device according to claim 9, wherein the wind collector comprises a spoiler adapted to be arranged at one end of a side surface of the building and is shaped for guiding the wind to a first gas channel and/or at least one secondary gas channel.

11. A device according to claim 9, wherein the wind collector comprises a wind channel having a wind opening arranged with a mouth close to an end of a side surface of the building for collecting and acquiring wind.

12. A device according to claim 8, wherein the device is adapted to connect with and to receive the first gas stream from a first gas source in the building or construction comprising a first ventilation exhaust, and to further connect with both of at least one second ventilation exhaust and at least one wind collector for receiving the at least one second gas stream.

13. A system installation for generating electrical power comprising a device according to claim 1 installed in connection with the building or the construction, wherein the system installation further comprises the building or the construction comprising the at least one first gas source arranged to provide the at least one first gas stream, and is arranged to convert the at least a part of the kinetic energy of the at least one first gas stream into electrical power.

14. A method for generating power from the at least one first gas stream with a device according to claim 1, the method comprising:
   receiving and feeding the at least one first gas stream from the at least one first gas source formed in connection with the building or the construction to the gas turbine,
   converting the at least a part of the kinetic energy of the at least one first gas stream into electrical power with the gas turbine in the device, and
   receiving and influencing the at least one second gas stream to form the sub-pressure in connection with exhaustion of the at least one first gas stream from the gas turbine.

15. A device according to claim 9, wherein the device is adapted to connect with and to receive the at least one first gas stream from a first gas source in the building or construction comprising a first ventilation exhaust, and to further connect with both of at least one second ventilation exhaust and at least one wind collector for receiving the at least one second gas stream.

16. A device according to claim 10, wherein the device is adapted to connect with and to receive the at least one first gas stream from a first gas source in the building or construction comprising a first ventilation exhaust, and to further connect with both of at least one second ventilation exhaust and at least one wind collector for receiving the at least one second gas stream.

17. A device according to claim 11, wherein the device is adapted to connect with and to receive the at least one first gas stream from a first gas source in the building or construction comprising a first ventilation exhaust, and further connect with both of at least one second ventilation exhaust and at least one wind collector for receiving the at least one second gas stream.

\* \* \* \* \*